UNITED STATES PATENT OFFICE 2,078,964

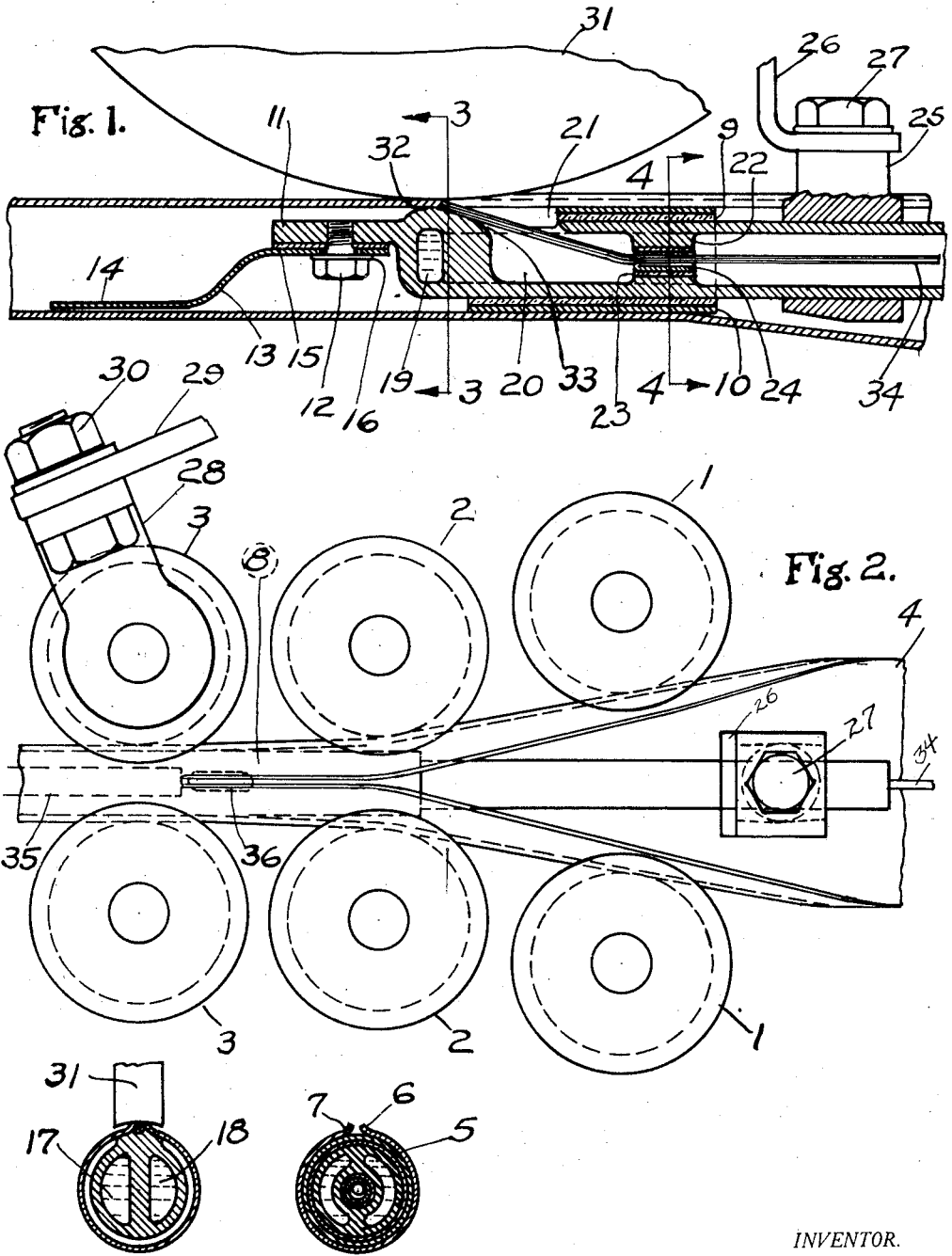

METHOD OF AND APPARATUS FOR ELECTRIC WELDING

Courtney N. Mitchell, Cleveland Heights, Ohio

Application February 24, 1930, Serial No. 430,692

8 Claims. (Cl. 219—10)

This invention, relating as indicated to electric welding, is directed to a method of and apparatus for effecting welds in which the actual jointing of the materials is not solely effected by the heat produced by an electric current. All types of electric welding heretofore employed to join longitudinal seams, heated the edges of the material forming the seam by an electric current and then by forcing together the adjacent edges a joining of the metal was accomplished.

By the method and apparatus comprising this invention I propose to employ a friction wheel which, contacting with the contiguous edges of the seam to be welded, simultaneously raises the temperature thereof to the welding point and also brings about the proper pressure to force the two edges of the seam together into the proper union.

To the accomplishment of the foregoing and related ends, said invention, then, consists of the means hereinafter fully described and particularly pointed out in the claims; the annexed drawing and the following description setting forth in detail certain means and one mode of carrying out the invention, such disclosed means and mode illustrating, however, but one of the various ways in which the principle of the invention may be used.

In said annexed drawing:

Fig. 1 is a longitudinal sectional view of the mechanism comprising my invention; Fig. 2 is a plan view of the mechanism illustrated in Fig. 1 with certain parts removed to more clearly bring out the salient features of construction; Fig. 3 is a fragmentary transverse sectional view of the mechanism illustrated in Fig. 1 taken on a plane substantially indicated by the line 3—3 but exaggerated in showing the edges of the seal cleft still uncompressed by the contacting wheel; and Fig. 4 is a transverse sectional view of the mechanism illustrated in Fig. 1 taken on a plane substantially indicated by the line 4—4.

Referring more specifically to the drawing and more especially to Figs. 1 and 2, the mechanism comprising my invention consists of a plurality of forming rolls 1, 2 and 3, which are adapted to form flat ribbon stock, as at 4, into substantially cylindrical form, as shown in Fig. 4, having a main cylindrical body 5 which has a longitudinal seam bounded by upturned ends 6 and 7.

After the ribbon stock has been formed into a cylinder in the manner more or less diagrammatically illustrated in Fig. 2, a cylindrical member 8 is so supported with respect to the entire mechanism comprising my invention that the main cylindrical portion of such member 8 occupies a position within the formed tube immediately adjacent to the forming rolls. The cylindrical member 8 is surrounded by an insulating sleeve 9 which carries a hardened wearing sleeve 10 which contacts with the inner periphery of the formed tube. The cylindrical member 8 has a lug 11 projecting longitudinally therefrom, which lug is adapted to be threadably engaged by a screw 12 which secures a spring member 13 to the end of the member 8. The spring member 13 has a substantially longitudinal portion thereof, as at 14, adapted to resiliently engage the inner periphery of the tube and maintain the cylindrical member 8 in proper position within the tube. The spring member 13 is insulated from the terminal portion 11 of the member 8 by insulating material 15, which is likewise adapted to prevent contact between the shank of the bolt 12 and the spring 13, and washer 16 of insulating material prevents electrical contact between the head of the screw 12 and the body of the spring member 13.

As most clearly shown in Figs. 3 and 4, the cylindrical body 8 has longitudinal apertures 17 and 18 extending therethrough which are joined at the foremost end of the member 8 by a cross-duct 19, by means of which a suitable cooling fluid may be introduced into the cylindrical body 8 and caused to circulate therethrough in order to prevent such body from over-heating.

The rearmost portion of the cylindrical body 8 has an aperture 20 extending therethrough, which aperture is in communication with another aperture 21 opening out through the side of the cylindrical body 8. In the elongated aperture 20 is a cross-web 22 which is centrally enlarged to support a collar 23 of insulating material which has coaxially mounted therein a bushing 24 for the purpose hereinafter more fully described. Rigidly secured to the body of the cylindrical body 8 is a binding post 25 which has a lead 26 secured thereto by means of a bolt 27. One of the forming rolls, preferably 3, as illustrated in Fig. 2, has associated therewith an extension 28 which has secured thereto a lead 29 by means of a nut 30.

The above described apparatus is so mounted that a frictional wheel 31 will engage the tube as it passes over the portion 32 of the cylindrical body 8.

In the operation of this device the ribbon stock from which the tube is to be formed is fed to the forming rolls in the manner illustrated in Fig. 2, which rolls form such ribbon stock into substantially cylindrical form having a longitudinal seam extending throughout, which seam is bordered by the upturned edges 6 and 7 of the tube. Through the bushing 24, a metallic wire is passed which extends upwardly through the aperture 21 and is brought into proper position between the upturned edges 6 and 7 of the seam by the action of the shoulder 33 of the cylinder body 8. The current from lead 29 to lead 26, or vice versa, will pass from the edges 6 and 7 of the tube and into the portions 33 and 32 of the cylindrical body 8, and in so passing, part of this current will traverse a portion of wire 34 causing arcing between this wire and the edges of the seam cleft thus raising this portion of the wire to a high temperature. The wire 34, having been raised to a high temperature, as it is being placed between the bent edges 6 and 7 of the seam, will pass, with such edges of the seam, under the friction wheel 31, which rotates at a relatively high rate of speed. The action of the friction wheel is to raise the temperature of the edges of the seam cleft and at the same time force such edges and the wire 34 together with sufficient force so that a welding of the edges is accomplished, the forcing together of the wire and the edges of the seam cleft occurring after current has passed between the wire and the edges of the cleft during the period of approach of the wire over the portion 33 of the mandrel. The form of the mandrel at 33 is such as to cause contact with the wire 34 over a substantial area at this point. The surface at 32 contacting with the interior of the tube is limited in area to restrict to a comparatively small amount, the current passing directly from the mandrel to the tube, the greater part of the current passing from the mandrel 8 to the tube through the wire 34 and thence to the roller 3, the wire 34 being the only other path for the current. If the angle between the wire 34 and the edges of the seam is comparatively large, for example, of the order illustrated in Fig. 1, and the amount of current is small, amounting to only a few hundred amperes, the greater part of the current passes at the immediate vicinity of the section line 3—3 and produces heat from the resistance of the wire to current flow as the wire enters the seam cleft, and the metals adhere in a plastic rather than in a molten condition. When the angle between the wire 34 and the edges of the cleft is reduced to the order of five degrees, and with the surface 33 prolonged to give a greater contact, and with current of several thousand amperes available, current flow will take place at all points of contact between the wire and the edges of the cleft. As the edges of the cleft are rough and irregular, the wire in approaching the cleft at the small angle will contact with small projections on the edges of the cleft causing currents to start in numerous parallel circuits which rapidly burn away the contacting projections thus opening these circuits and causing numerous miniature arcs to form where the current tends to continue after actual contact has been momentarily broken by the metal having melted away. These numerous arcs passing between the edges of the cleft and the wire along an appreciable length of increased mandrel face 33 produce a higher degree of heat than is obtainable with the direct flow of current without arcing and consequently a more secure and more satisfactory weld. The heat from the arcing is mainly of the nature of surface heat of very high temperature, while the current flowing along the wire and into the tube wall produces internal heat in the wire softening its core so that the short portion of the mandrel at 32 and the wheel 31 may better be able to compress the seam to the desired finished form both on the exterior and interior of the tube.

In the manufacture of tubing having relatively thin walls it is found that the heat produced by the friction wheel alone, when such wheel is traveling at a relatively high speed, is sufficient to raise the contiguous edges of the seam cleft to the proper welding temperature without the use of any additional heating means, such as an electric current. When tubing of this character is being welded, that is, when the heat produced by the friction wheel is sufficient to produce the weld, the auxiliary material, above described as a wire, may be omitted and the edges of the seam cleft brought into intimate contact by having the outside diameter of the cylindrical body 8 slightly reduced in size from that shown in Fig. 4. Other types of tubing may be of a nature such that the use of the auxiliary welding material is undesirable, and in such cases, should the action of the friction wheel be insufficient to raise the temperature to the proper welding point, an electric current may be employed by connecting the lead 26 to the forming roll 3 opposite to the one which has the lead 29 connected thereto as shown in Fig. 2. I may prefer to connect the lead 26 to the friction wheel through the medium of a slip ring or the like and have the current flow between the wheel and the stock.

For the purpose of illustrating my invention, the accompanying drawing, especially in Fig. 2, has been made somewhat diagrammatic in form in order to more clearly bring out the principles of my invention. It will be noted in connection with Fig. 2 that the friction wheel 31 is omitted entirely, since to include such wheel would obscure the formation of the seam cleft and the manner in which the auxiliary welding material is fed thereto. The dotted outline at 35 shows the area of the tube which has been in contact with the friction wheel as the seam cleft passes along the wheel, and the area indicated by the dotted lines at 36 indicates the outline of the aperture 21 through which the wire 34 is fed to the seam cleft, and this is also the area at which the arcing takes place between the auxiliary material 34 and the edges 6 and 7 of the seam cleft and the electrode 8 at points 32 and 33.

The current passing from lead 29 through roller 3 enters the cylindrical wall of the tube and in passing to lead 26 must be concentrated at the point where the wire 34 enters the seam cleft as at sec. 3—3 of Fig. 1. As the largest surface of contact present is that of the wire with the surface 33 the greater portion of this current will pass through the wire before wheel 31, contacting with edges 6 and 7, forces the material supporting these edges into any contact with the electrode 8 as indicated in Fig. 3. As the portion 32 of this electrode is of such form as to present a very limited and receding surface of contact due to its curved shape, only a limited amount of current will flow from the tube walls directly to this electrode, the greater part of the current passing through the wire to the electrode.

From welding experience, it is well known that when a heavy current is passed between metallic elements under light and slowly approaching pressures, the irregularities always present on the contacting surfaces cause the higher points to burn away. The tendency of the current to continue produces arcs at these burned away points and the loss of the mechanical support of these points permits the formation of new points of contact and subsequent regions of arcing. This progressive action takes place very rapidly and the entire contacting surface is thus heated in such a way as to appear to the eye as instantaneous.

As the wire enters the seam cleft, contacts are made on both sides of the wire and the arcing is maintained simultaneously between this wire and both edges of the cleft which brings both wire and edges to welding temperature by the time the wire has fully entered the cleft. The portion of the current flowing directly from the tube to the electrode at 32, and which may be considered as a parallel circuit, further heats the tube edges and the wire thus associated therewith both by direct resistance and by some arcing which occurs between the inner surface of the tube and the receding part 32 of the electrode 8. The action of the wheel 31 which now contacts with the edges of the seam cleft forces these edges down into correct form, and, if rotating at sufficiently high speed will further add to the welding heat which addition may serve to save considerable welding current that otherwise might be required. Welding is thus produced by the combination of three sources of heat: the arcing between the wire 24 and the edges of the seam cleft over its contacting surface at 33; the direct flow of current from the tube contacting with or in arcing relation with the surface 32 which circuit is in parallel with the former circuit; and, heat from the action of wheel 31 contacting with the tube edges at or immediately subsequent to the heating from current entering electrode 8 at 32.

It will be apparent that modifications may be made in the form of the surfaces at both 32 and 33 and in the composition and other structural features of all parts of the electrode 8 to regulate the distribution of current and that the position of wheel 31 may be adjusted to further vary the results obtained.

A further description of this invention is believed unnecessary for those acquainted with the art, suffice it to say that numerous changes may be made in the detail construction of the various parts without deviating from the principles of this invention.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The method of welding the edges of an open seam in tubing, which consists of mechanically confining and supporting the edges to be united in proximity with each other, of introducing a strip of material from within the tubing into contacting relationship with the metal at the edges of said seam, of passing an electric current from lateral portions of said strip to the edges of said seam, and of forcing the edges of said seam and said strip of material into welded relationship.

2. The method of welding the edges of an open seam in tubing, which consists of forming such seam with upturned adjacent edges, of mechanically confining and supporting the edges to be united in spaced relationship, of introducing a strip of metal from within the tubing into contacting relationship with the metal at the edges of said seam, of passing heating currents between the edges of said seam and lateral portions of said strip of metal, and of forcing the edges of said seam and said strip of metal into welded relationship.

3. In a welding mechanism, the combination with means for supporting the edges of the seam cleft in a tube to be welded, an electrode within said tube, guiding means within said electrode for directing a strip of metal into the said seam cleft, means for heating the edges of said seam cleft and said strip of metal by an electric current passing between said edges and lateral parts of the strip, and means for compressing together the said edges and the said strip.

4. In mechanism for welding tubing, the combination of an electrode within the tubing, said electrode being adapted to pass current into lateral parts of a strip of auxiliary welding material, means incorporated in said electrode for positioning the said auxiliary welding material in a seam cleft in said tubing, means for heating the edges of said seam cleft by current passing laterally through the auxiliary welding material and means for compressing together the said auxiliary welding material and the said edges of the seam cleft.

5. In mechanism for welding tubing, the combination of an electrode within the tubing, said electrode being adapted to pass current into lateral parts of a strip of auxiliary welding material, means for positioning said auxiliary material in contact with the inner portions of the edges of a seam cleft to be welded, means for heating the edges of the seam cleft by electric current from the aforesaid electrode, means for forcing the auxiliary welding material outwardly into said seam cleft, and external means for compressing together the said auxiliary welding material and the edges of said seam cleft.

6. In a mechanism for welding tubing, the combination of an electrode within such tube, means for holding the electrode in pressure engagement with said tube, means for passing current through said electrode, said electrode being adapted to heat auxiliary welding material to welding temperature and to position said welding material in a seam cleft to be welded, and friction means adapted to contact with said seam cleft to effect a heating and a forcing together thereof in welded relation.

7. In a mechanism for welding tubing, the combination of an electrode mounted in an insulated sleeve and adapted to contact with the inner periphery of such tube and to heat an auxiliary welding material and pass the same to the seam cleft of such tube, means for cooling said electrode, pressure means for holding the electrode in engagement with said tube, means for supplying heating current to said electrode, and a rotary friction member adapted to contact with the edges of the seam cleft and heat and force together such edges in welded relation.

8. In a mechanism for welding tubing, the combination of a hollow electrode within said tubing adapted to feed an auxiliary welding material to the seam cleft to be welded, means for sending welding current from said electrode to the edges of said seam cleft laterally through said auxiliary welding material and means for bringing such auxiliary material and said edges into welding relation.

COURTNEY N. MITCHELL.